United States Patent [19]
Mita

[11] Patent Number: 4,988,854
[45] Date of Patent: Jan. 29, 1991

[54] TEMPERATURE COMPENSATING CARD CONVEYOR

[75] Inventor: Katsuya Mita, Kyoto, Japan

[73] Assignee: Omron Tateisi Electronics Co., Kyoto, Japan

[21] Appl. No.: 274,341

[22] Filed: Nov. 21, 1988

[30] Foreign Application Priority Data

Nov. 26, 1987 [JP]  Japan .................................. 62-298471

[51] Int. Cl.$^5$ ......................... G06K 7/01; G06K 13/04
[52] U.S. Cl. ................................... 235/476; 235/449; 235/481; 360/2
[58] Field of Search ..................... 360/2; 235/475, 476, 235/449, 454, 437, 438, 439, 481; 198/855, 856, 858, 859

[56] References Cited

U.S. PATENT DOCUMENTS

| | | | |
|---|---|---|---|
| 3,227,344 | 1/1966 | Rutter | 271/34 |
| 3,986,206 | 10/1976 | Fayling | 360/2 |
| 4,803,349 | 2/1989 | Sugimoto et al. | 235/475 |

FOREIGN PATENT DOCUMENTS

| | | |
|---|---|---|
| 1417468 | 11/1964 | France . |
| 2533339 | 3/1984 | France . |
| 55-77036 | 6/1980 | Japan . |
| 57-97178 | 6/1982 | Japan . |
| 57-14070 | 8/1983 | Japan . |

Primary Examiner—Stuart S. Levy
Assistant Examiner—Robert Weinhardt
Attorney, Agent, or Firm—Dickstein, Shapiro & Morin

[57] ABSTRACT

There is provided a card reader which has a card conveying path to sandwich and convey a card between the surfaces of a pair of opposite conveying belts reeved around pulleys and which processes card data by a card processing section arranged on the card conveying path. When it is detected that a drive motor to drive the conveying belts is continuously stopped for a predetermined period of time, the drive motor is raced for a predetermined period of time to prevent that the belts are deformed.

2 Claims, 5 Drawing Sheets

TEMPERATURE COMPENSATING CARD CONVEYOR

BACKGROUND OF THE INVENTION

1. Field of the Invention

The present invention relates to a card reader provided in, for example, automatic cash depositing and dispensing machines or automated teller machines which read data from and writes data onto a card. The types of machines used with the card reader can read magnetic cards, or credit cards and optical cards such as transformed in cash cards, bank cards, or credit cards, etc. More particularly, the present invention relates to a card reader which can improve the conveying performance of the card at low temperatures.

2. Prior Art Statement

In general, as shown in a flowchart of FIG. 4, a card reader is set to a standby mode when a power source is turned on in step 61. In the standby mode, if the insertion of a card is detected in step 62, a motor is driven in step 63 to convey the card to a card processing position located internally in the ATM. In step 64, data is read out from or written onto the card conveyed to the card processing position. Thereafter, in step 65, the card on the card conveying path is returned by reversely driving the motor. After the card is returned, the motor is stopped in step 66 and the card transaction is finished.

Conveying belts having soft elastic qualities are suitable for conveying the card. The card is conveyed by sandwiching it, as shown in FIG. 5a, between a pair of upper and lower conveying belts 52 and 53 which are reeved around pulleys 51 to face each other.

However, when the card reader is stopped for a long time, for instance, at low temperatures at night, the soft elastic qualities of the conveying belts deteriorates. As a result, the portions of the belts reeved to the pulleys become hard in the curved state along the outer peripheral surfaces of the pulleys. Therefore, as shown in FIG. 5b, when the movement of the conveying belts is started, the curved portions 54 of the belts do not completely straighten out into straight lines. The belts are thereby rotated with the slightly expanded curved portions. Thus, the conveying speed of the card which is sandwiched and conveyed between the conveying belts 52 and 53 having the curved portions becomes unstable, causing a defective data processsng operation.

SUMMARY OF THE INVENTION

It is an object of the present invention to provide a card reader which can always smoothly convey a card so as not to cause curved portions in the portions along pulleys of conveying belts even at low temperatures.

According to the invention, this object is accomplished by a card reader comprising a means for detecting that a drive motor to drive conveying belts on a card conveying path is stopped for a predetermined period of time and a control means for racing the drive motor for a predetermined period of time to prevent the deformation of the belts.

According to the invention, each time the conveyance stop time has elapsed for a predetermined period of time, the drive motor is driven for a predetermined period of time, thereby racing the conveying belts. Thus, the conveying belts are raced before they are hardened, so that the same positions of the conveying belts are not received about with the pulleys for a long period of time and as a result, the occurrence of the curved portions is prevented.

Therefore, by performing the pre-driving operation whole lengths of the conveying belts are always uniformly reeved and supported and even at low temperatures at night or the like when the belts are easily hardened. So that the soft elastic qualities of the belts is maintained and the deformation of the belts is prevented. Thus, the circulating speeds of the conveying belts can become stable and the card can be smoothly conveyed thereby maintaining a high performance quality for the card reader.

BRIEF DESCRIPTION OF THE DRAWINGS

FIG. 32 is a block diagram of a control circuit of the magnetic card reader;

DETAILED DESCRIPTION OF THE PREFERRED EMBODIMENT

An embodiment of the present invention will be described in detail hereinbelow with reference to the drawings.

Figure 1:
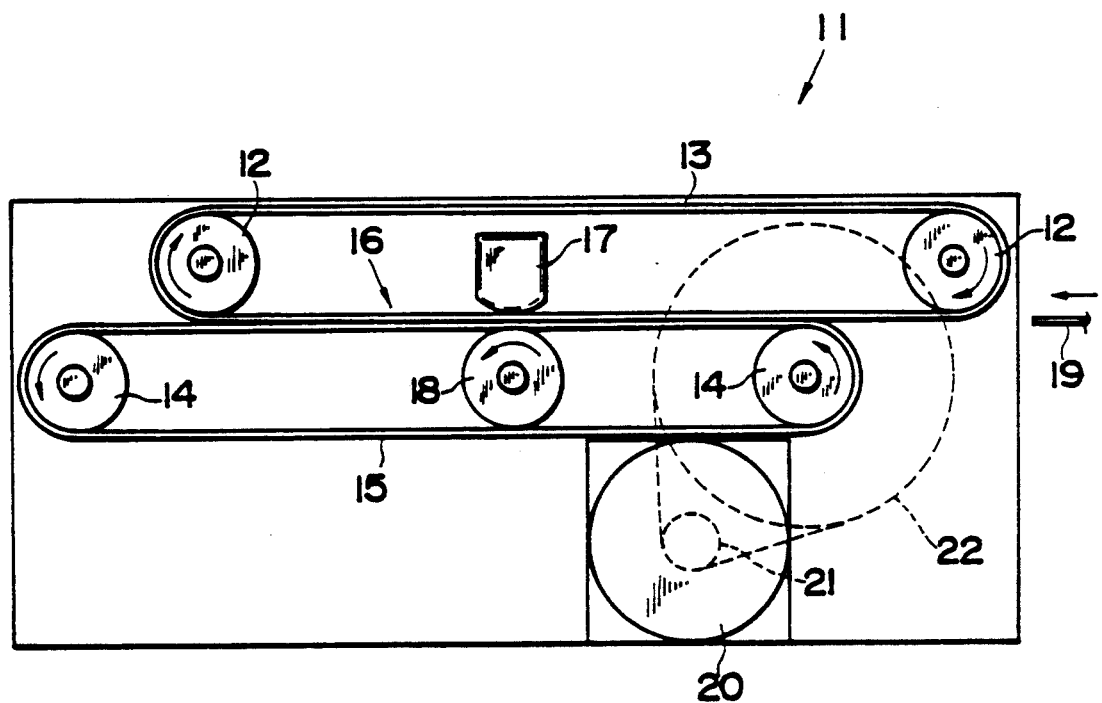
FIG. 1 is a side elevational view of a magnetic card reader.

In FIG. 1, magnetic card reader 11 is illustrated having an, upper conveying belt 13 reeved around upper pulleys 12 and lower conveying belts 15 reeved around lower pulleys 14. The conveying belts 13 and 15 are arranged so as to face each other, thereby providing a horizontal sandwiching conveying path 16 for a card 19.

A magnetic head 17 is located between pulleys 12 to read or write data onto/from the card 19. A roller 18 is vertically arranged below to the magnetic head 17 at the intermediate position of the sandwiching conveying path 16. In operation, data on a mangetic stripe of the card 19 which is conveyed to a position below the magnetic is head 17 read out or written onto by the head 17 as part of the data processing operation of the device.

In the conveying path 16, the rotation of a drive motor 20 is transferred to one of the lower pulleys 14 which is attached coaxially with a driven pulley 22 through a drive pulley 21 and the driven pulley 22, thereby rotating the upper and lower conveying belts 13 and 15.

Figure 2:
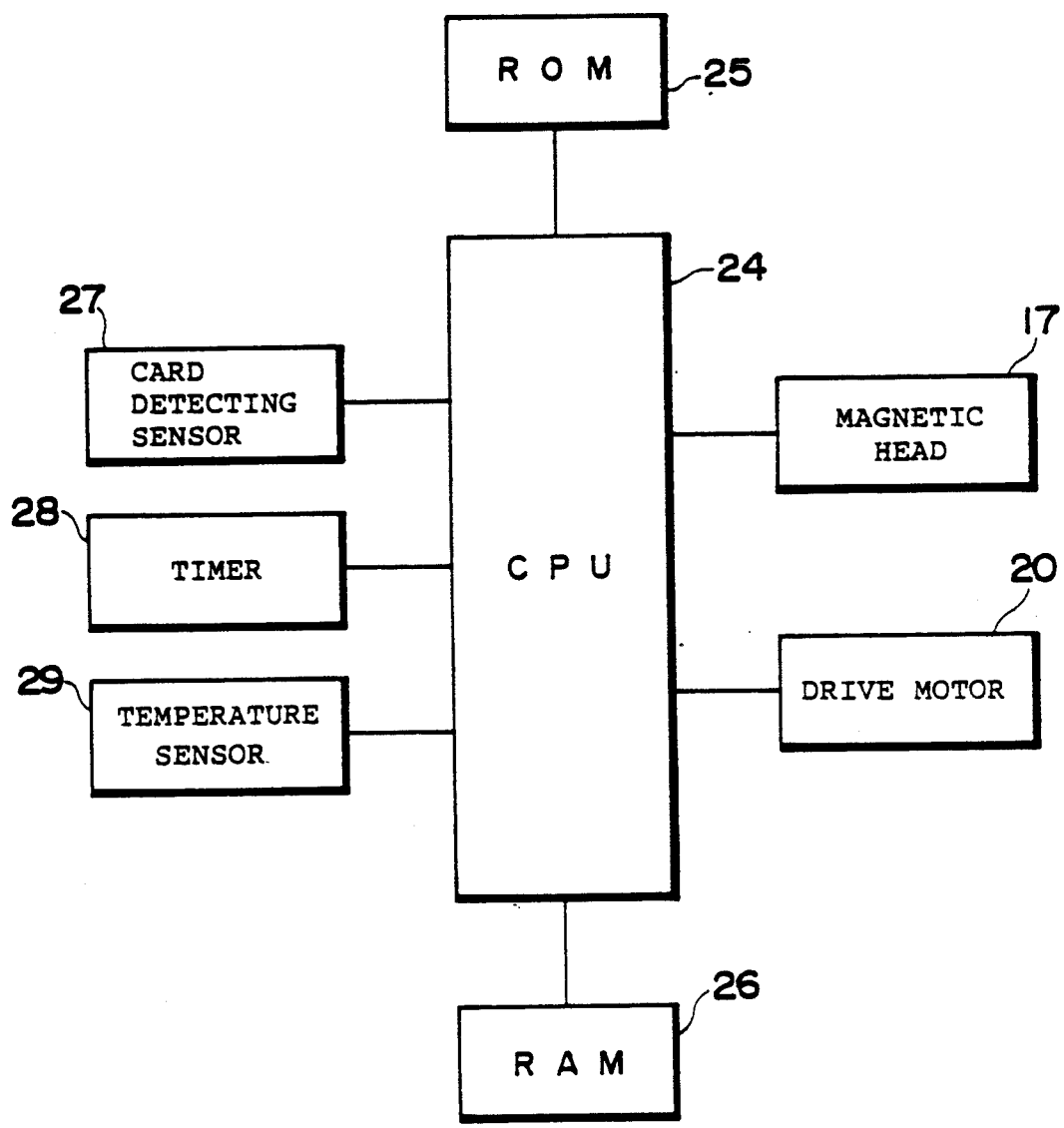

FIG. 2 shows a block diagram of a control circuit of the magnetic card reader. A CPU 24 controls each circuit and apparatus in accordance with a program stored in a ROM 25. A RAM 26 stores and reads out predetermined data. A card detecting sensor 27 is arranged at the front stage of the conveying path 16 to detect that the magnetic card 19 has been inserted. A temperature sensor 29 is arranged to detect a temperature of the the card reader and provide the detected temperature data to the CPU 24. A timer 28 is also connected to the CPU 29 to count down a predetermined period that the conveyor is allowed to remain in a stop state while the card transaction is awaiting execution. When the timer 28 detects the elapse the predetermined time period to provides a signal to the CPU 24. In response, the races CPU the drive motor 20 for a predetermined period of time. As a result, permanent curing of the portions of the conveying belts 13 and 15 secured about the pulleys 12 and 14 is avoided. Thus, the whole lengths of the conveying belts 13 and 15 are always uniformly reeved and supported. The circulating speeds of the conveying belts also become stable, and the card can be smoothly conveyed.

Figure 3:
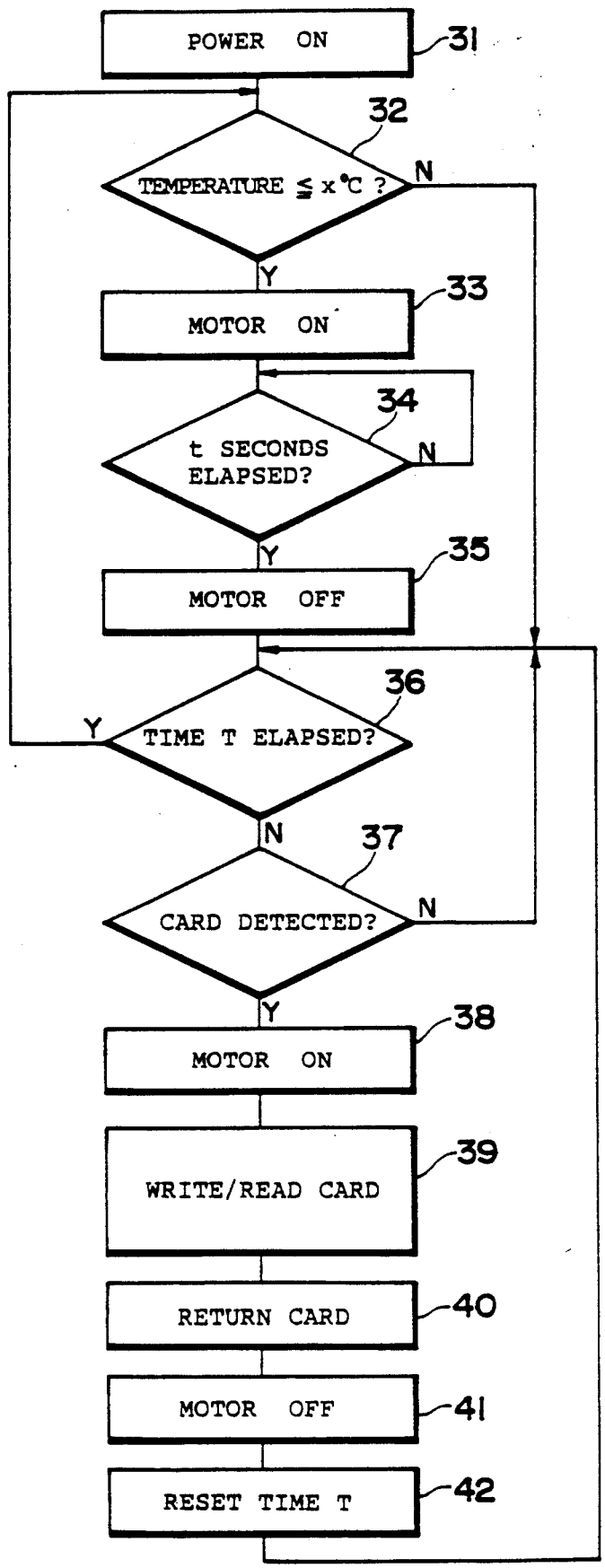
FIG. 3 is a flowchart showing a processing procedure in the magnetic card reader.
Figure 4:
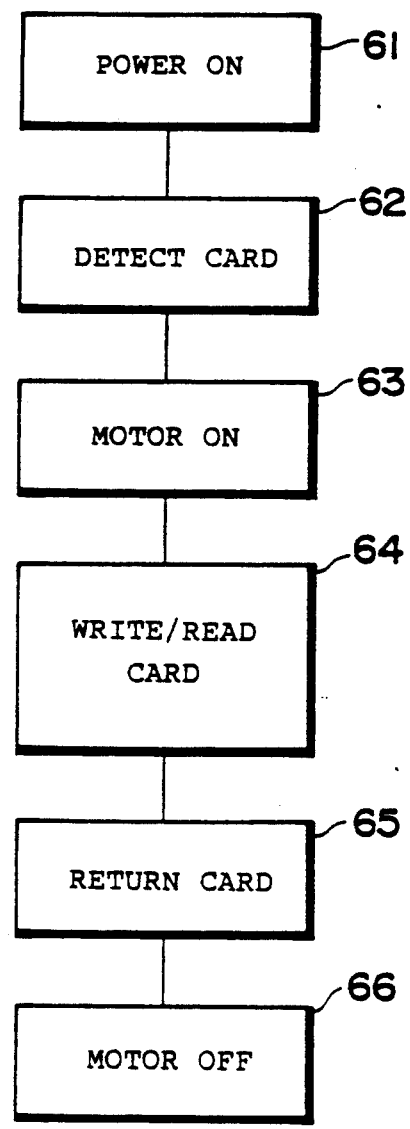
FIG. 4 is a flowchart showing a processing procedure in a conventional card reader.
Figure 5A:
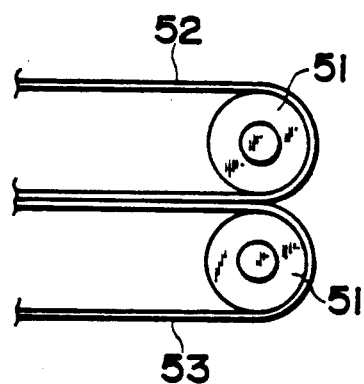
FIG. 5a is an explanatory diagram of a stop state of the conveying belts.
Figure 5B:
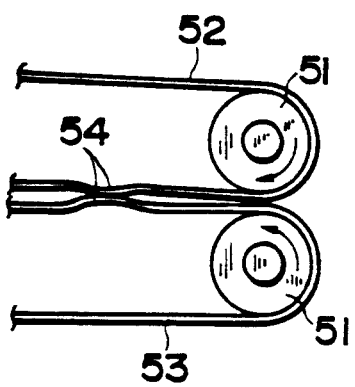
FIG. 5b is an explanatory diagram of a starting state of conveying belts.

The processing procedure of the magnetic card reader constructed in the manner described above will now be discussed with reference to a flow chart of FIG. 3. In step 31, when a power source is turned on, the magnetic card reader 11 initially is set to a standby mode. In the standby mode, a current temperature is checked in step 32. If the temperature lies within a low temperature range ($x°C$. or less) that would cause the belts to harden, the motor 20 is driven in step 33 to race the upper and lower conveying belts 13 and 15, thereby preventing hardening of the soft belts 13 and 15.

In step 34, when it is detected that the racing time has elapsed for the predetermined time period t, the driving of the motor 20 is stopped in step 35. Thus, the conveying belts 13 and 15 are raced before they are hardened at low temperatures. As a results, portions of the conveying belts 13 and 15 locally come into contact with the pulleys 12 and 14 for short periods of time, so that those portions of the belts 13 and 15 can be prevented from being curved.

In step 36, when the continuous stop time of the drive motor 20 has alapsed the predetermined time period T, the processing routine is returned to step 32 to again race the belts 13 and 15 and the subsequent processes are executed. However, if the continuous stop time T of the drive motor 20 has not elapsed, then, the transacting process at step 37 follows.

Specifically, in step 37, when it is detected that the magnetic card 19 has been inserted below the magnetic card reader 11, the motor 20 is driven in step 38 to convey the inserted magnetic card 19 to an inner corresponding position of the magnetic head 17. In step 39, data is read out from or written onto the magnetic card 19 conveyed to the corresponding position of the magnetic head 17. Thereafter, in step 40, the magnetic card 19 on the conveying path 16 is returned by reversely rotating the motor 20. After the card is returned, the driving of the motor 20 is stopped in step 41 and the transaction using the card is finished. In response to stopping the driving of the motor 20, the timer 28 starts the timing operation in step 42. After a measured time period T has elapsed the processes in step 36 and subsequent steps are repeated so as to again race the conveying belts 13 and 15.

Each time the stop time T elapses because the card transaction is not executed, the drive motor is driven for the predetermined period of time t to race the conveying belts. Consequently, the conveying belts are raced before they are hardened, so that the occurrence of the curved portions which are formed can be prevented.

Therefore, the whole lenghs of the conveying belts are always uniformly reeved and supported. Even at low temperatures at night or the like when the belts are easily hardened, by performing the pre-driving operation of the belts, the quality of the soft belts can be maintained and the deformation of the belts can be prevented. Thus, the circulating speeds of the conveying belts become stable and the card can be smoothly conveyed and stable data processes having high performance quality can be executed.

What is claimed is:

1. A card reader which has a card conveying path to sandwich and convey a card between surfaces of a pair of opposite conveying belts reeved around pulleys and which processes card data by a card processing section arranged on said card conveying path, said card reader comprising:
    means for detecting the operating status of said card reader which produces a signal when said status exceeds a threshold; and
    control means connected to said detecting means for racing said drive motor for a predetermined period of time to prevent deformation of the belts in response to said signal.

2. A card reader according to claim 1, wherein said detecting means comprises:
    means for detecting that a drive motor to drive the conveying belts is stopped for a predetermined period of time; and
    a temperature sensor to detect an ambient temperature of the card reader wherein said control means for racing the drive motor is energized once a detected temperature by said temperature sensor reaches or exceeds a predetermined temperature threshold and once said conveying belt is stopped for a predetermined period of time.

* * * * *